United States Patent
Sung et al.

(10) Patent No.: US 9,557,778 B2
(45) Date of Patent: Jan. 31, 2017

(54) HINGE FOR A DEVICE

(71) Applicant: Intel Corporation, Santa Clara, CA (US)

(72) Inventors: Pei-Yang Sung, Taichung (TW); Jeff Ku, Taipei (TW); Ming-Che Lee, New Taipei (TW); Simon Tsai, Taoyuan (TW)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/752,920

(22) Filed: Jun. 27, 2015

(65) Prior Publication Data
US 2016/0378145 A1 Dec. 29, 2016

(51) Int. Cl.
*G06F 1/16* (2006.01)
*E05F 1/12* (2006.01)

(52) U.S. Cl.
CPC ........... *G06F 1/1681* (2013.01); *E05F 1/1207* (2013.01); *G06F 1/1626* (2013.01)

(58) Field of Classification Search
CPC .... G06F 1/1681; G06F 1/1626; G06F 1/1632; G06F 1/1654; G06F 1/1616–1/1622; E05F 1/1207; Y10T 16/53828; Y10T 16/5388; Y10T 16/53888; Y10T 16/54038; Y10T 16/5403; Y10T 16/5401
USPC ........................................ 361/679.41–679.44
See application file for complete search history.

(56) References Cited

U.S. PATENT DOCUMENTS

| | | | |
|---|---|---|---|
| 7,505,255 B2 * | 3/2009 | Wu | G06F 1/16 361/679.27 |
| 9,256,255 B2 * | 2/2016 | Chang | G06F 1/1632 |
| 9,310,848 B2 * | 4/2016 | Fujino | G06F 1/1681 |
| 2011/0292584 A1 | 12/2011 | Hung et al. | |
| 2013/0335914 A1 | 12/2013 | Lee | |
| 2014/0036430 A1 * | 2/2014 | Wroblewski | G06F 1/1626 361/679.4 |
| 2014/0071604 A1 | 3/2014 | Bates et al. | |
| 2015/0043155 A1 * | 2/2015 | Liang | G06F 1/1669 361/679.43 |
| 2015/0116927 A1 | 4/2015 | Robinson et al. | |
| 2016/0241076 A1 * | 8/2016 | Bowers | G06F 1/1632 |

FOREIGN PATENT DOCUMENTS

WO     2014193408 A1     12/2014

OTHER PUBLICATIONS

International Search Report and Written Opinion in International Application No. PCT/US2016/034506, mailed on Aug. 24, 2016, 10 pages.

* cited by examiner

*Primary Examiner* — Zachary M Pape
(74) *Attorney, Agent, or Firm* — Patent Capital Group

(57) ABSTRACT

Particular embodiments described herein provide for device that includes a first housing, a cradle, and a hinge that rotatable couples the first housing to the cradle. The hinge includes a switch bolt configured to selectively provide friction torque to the hinge, a torsion spring configured to provide spring torque to the hinge, and a switch mechanism to activate and deactivate the switch bolt, wherein the friction torque provided by the switch bolt is greater than the spring torque provided by the torsion spring.

20 Claims, 10 Drawing Sheets

HINGE FOR A DEVICE

TECHNICAL FIELD

This disclosure relates in general to the field of electronic devices, and more particularly, to a hinge for an electronic device.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
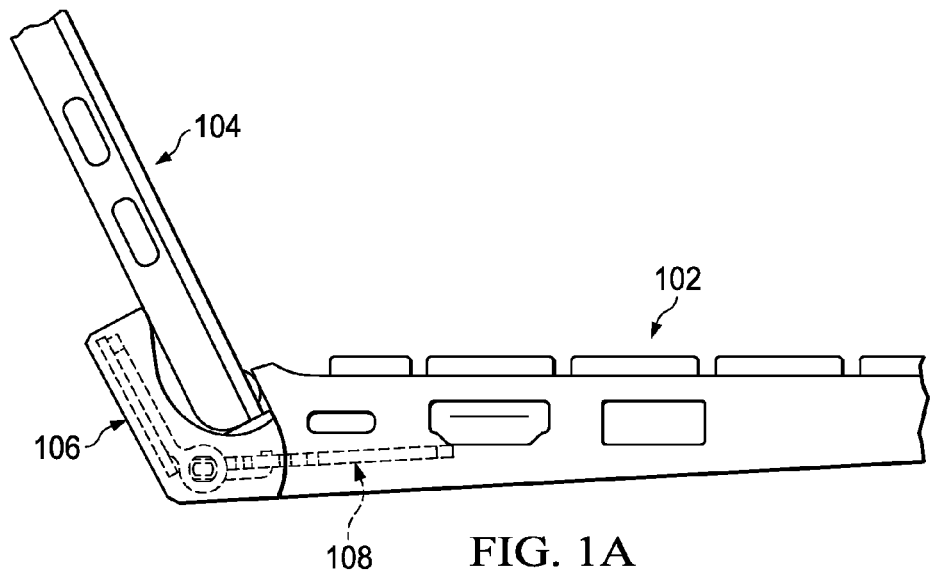
FIG. 1A is a simplified schematic diagram illustrating an orthographic view of an embodiment of an electronic device in an attached default configuration, in accordance with one embodiment of the present disclosure.

FIG. 1A is a simplified orthographic view illustrating an embodiment of an electronic device 100 is an attached configuration, in accordance with one embodiment of the present disclosure. Electronic device 100 can include a first housing 102, a second housing 104, a second housing cradle 106, and a hinge 108. As illustrated in FIG. 1A, hinge is in a default configuration.

Figure 1B:
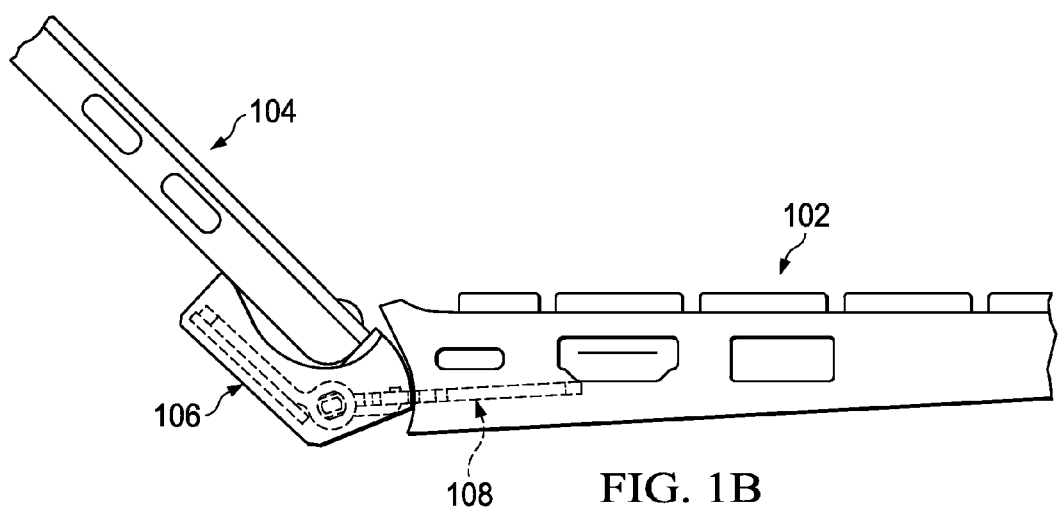
FIG. 1B is a simplified schematic diagram illustrating an orthographic view of an embodiment of an electronic device, in an attached tilted configuration in accordance with one embodiment of the present disclosure.

Turning to FIG. 1B, FIG. 1B is a simplified schematic diagram illustrating a side plan view illustrating electronic device 100 in an attached tilted configuration, in accordance with one embodiment of the present disclosure. As illustrated in FIG. 1B, electronic device 100 has been titled or rotated from the default configuration illustrated in FIG. 1A to a titled or rotated configuration. In an example, a user of electronic device 100 may have tilted or rotated second housing 104 to create a better viewing angle of a display included in second housing 104. In one or more embodiments, electronic device 100 is a hybrid electronic device, a 2-in-1 electronic device, a notebook or laptop computer with a removable display (e.g., second housing 104), or some other similar device.

Figure 1C:
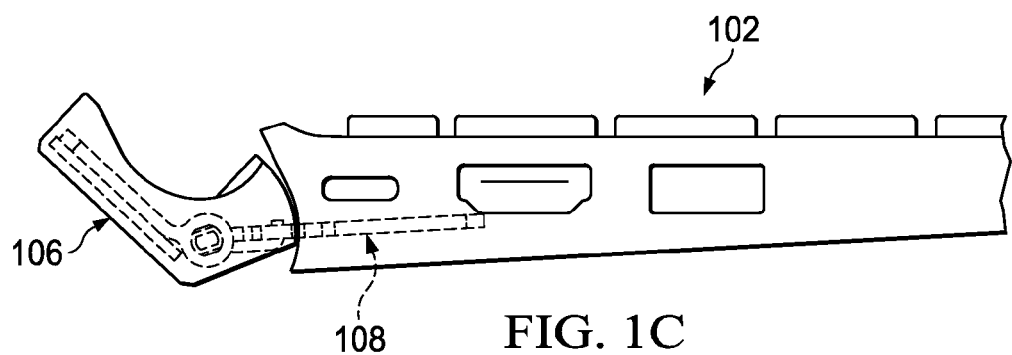
FIG. 1C is a simplified schematic diagram illustrating an orthographic view of an embodiment of a portion of an electronic device in a detached tilted configuration, in accordance with one embodiment of the present disclosure.

Turning to FIG. 1C, FIG. 1C is a simplified schematic diagram illustrating a side plan view of an embodiment of a portion of an electronic device in a detached tilted configuration, in accordance with one embodiment of the present disclosure. As illustrated in FIG. 1C, second housing 104 has been removed from first housing 102. Second housing 104 may be a standalone tablet that can be docked with first housing 102. First housing 102 may be a base or keyboard attachment for first housing 102.

Figure 1D:
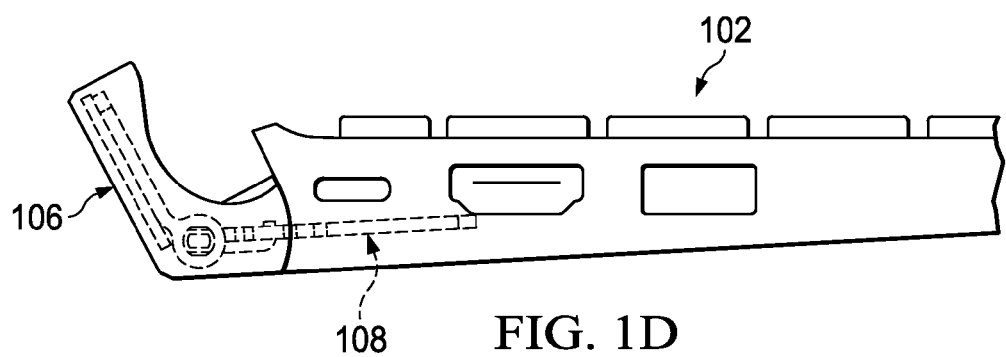
FIG. 1D is a simplified schematic diagram illustrating an orthographic view of an embodiment of a portion of an electronic device in a detached default configuration, in accordance with one embodiment of the present disclosure.

Turning to FIG. 1D, FIG. 1D is a simplified schematic diagram illustrating a side plan view of an embodiment of a portion of an electronic device in a detached default configuration, in accordance with one embodiment of the present disclosure. As illustrated in FIG. 1D, hinge 108 has rotated from the titled position in FIG. 1C and has returned to the default open configuration. In an example, when second housing 104 is removed from first housing 102, hinge will automatically return to the default configuration illustrated in FIG. 1D.

For purposes of illustrating certain example features of electronic device 100, the following foundational information may be viewed as a basis from which the present disclosure may be properly explained. Typically hinges with torsion springs are used for assisting the lid opening motion features of various electronic devices. With a fine tuned torsion spring mechanism, users can open or tilt the lid of electronic devices with one hand, instead of using one hand to open the lid, and another hand to hold the laptop base in order to overcome the holding torque. In other words, the torsion spring mechanism provides better user experience. However, when the torsion spring is assembled along with the washer elements on the same axis, the output torque will be related to both the washer and the torque spring. As a result, there's no switch mechanism that provides independent torque output source selection (e.g., torque comes either from the washer, torque spring, or combined). That means that the torque output is limited within a range and conventional designs are not able to fulfill the desired motion if the required torque of the device varies drastically under different scenarios. What is needed is a hinge design with an automatic switch mechanism that can vary the torque output.

A hinge design as outlined in FIGS. 1A-1D, with an automatic switch mechanism, can resolve these issues (and others). Electronic device 100 can include hinge 108. Hinge 108 can be configured to integrate an automatic switch mechanism in the hinge assembly. The switch mechanism may be triggered by external motions such as second housing 104 insertion into cradle 106 of first housing 102, by magnet inducting, mechanic activation, electrical activation, or some other means of automatically activating the switch mechanisms. The switch mechanism can be configured to select the torque output source located in hinge 108.

Figure 2:
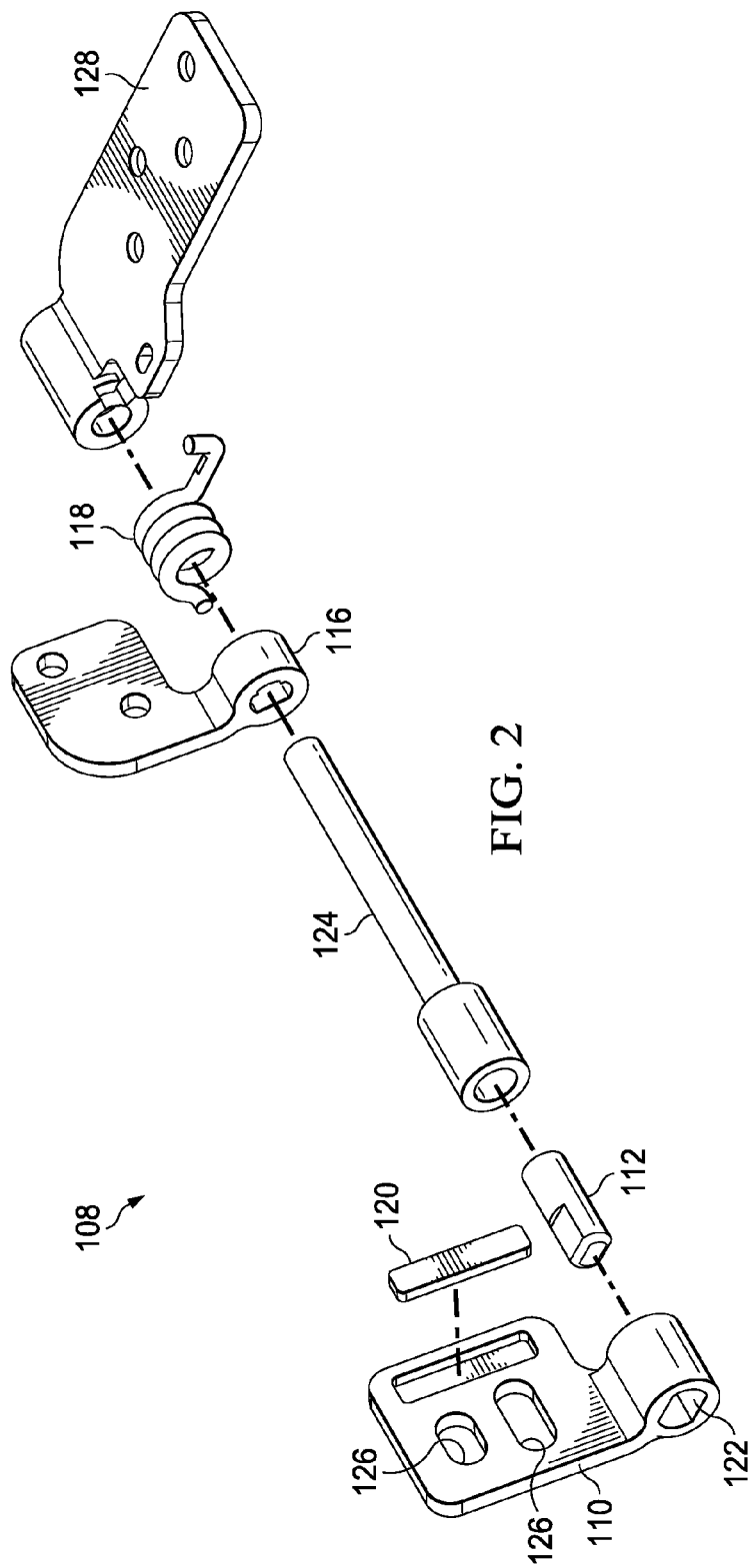
FIG. 2 is a simplified schematic diagram illustrating an orthographic exploded view of a hinge of an electronic device, in accordance with one embodiment of the present disclosure.
Figure 3:
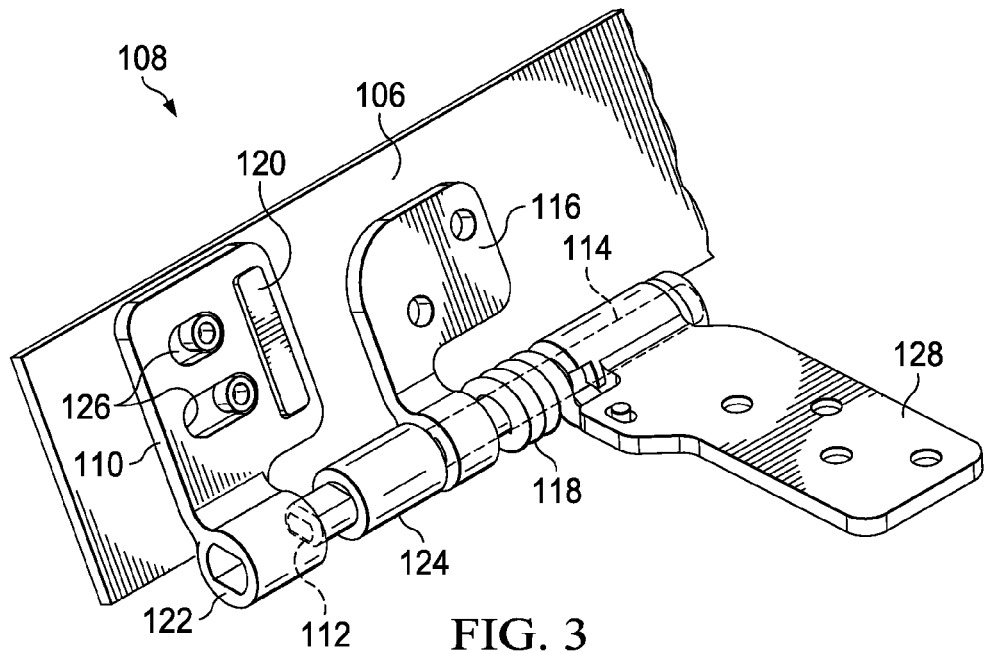
FIG. 3 is a simplified schematic diagram illustrating an orthographic view of a hinge of an electronic device, in accordance with one example implementation.

Turning to FIG. 2, FIG. 2 is a simplified schematic diagram illustrating an orthographic exploded view of a hinge of an electronic device, in accordance with one embodiment of the present disclosure. Hinge 108 can include a switch plate 110, a switch bolt 112, a cradle hinge plate 116, a torsion spring 118, a switch mechanism 120, a switch bolt receptacle 122, a main hinge rod 124, switch plate channels 126, and a first housing hinge plate 128. In an example, switch mechanism 120 may be a magnet. The magnet in switch mechanism 120 may be a rare earth magnet Turning to FIG. 3, FIG. 3 is a simplified schematic diagram illustrating an orthographic view of a hinge of an electronic device, in accordance with one example implementation. Main hinge rod 124 can be inserted into a hinge rod receptacle 114 to allow rotation of cradle hinge plate 116 relative to first housing hinge plate 128. As illustrated in FIG. 3, hinge 108 is in a default position. Switch mechanism 120 has not been activated and switch plate 110 has not been moved such that switch bolt 112 engages switch bolt receptacle 122. In this configuration, the torque provided to hinge 108 is spring torque from torsion spring 118.

Figure 4:
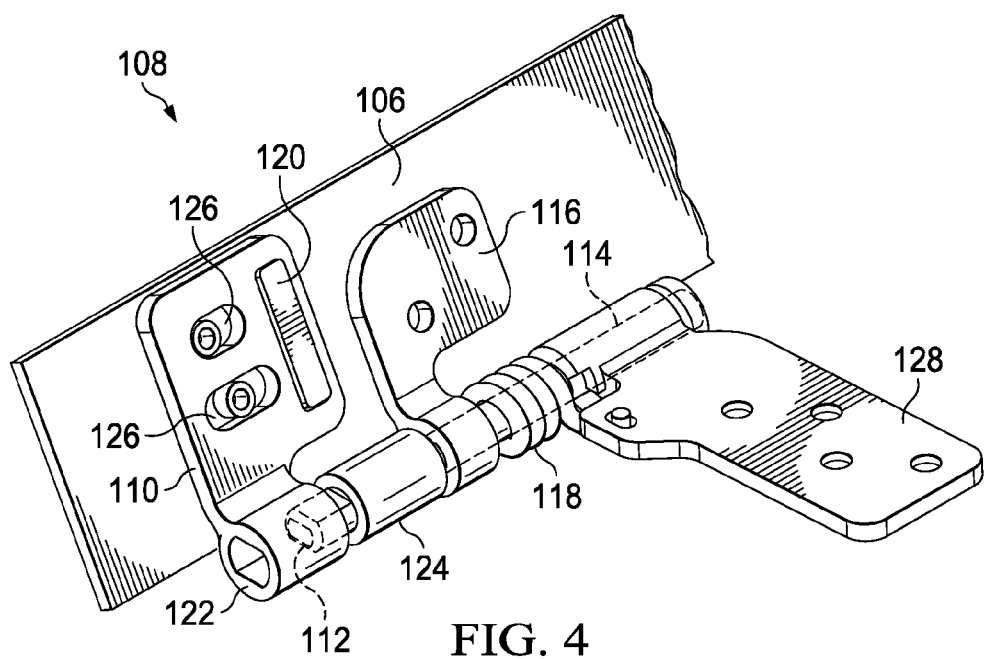
FIG. 4 is a simplified schematic diagram illustrating an orthographic view of a hinge of an electronic device, in accordance with one embodiment of the present disclosure.

Turning to FIG. 4, FIG. 4 is a simplified schematic diagram illustrating an orthographic view of a hinge of an electronic device, in accordance with one embodiment of the present disclosure. As illustrated in FIG. 4, hinge 108 may be in an attached titled position. In this configuration, switch mechanism 120 has been activated and switch plate 110 has been moved along switch plate channels 126 such that switch bolt 112 engages switch bolt receptacle 122. In this configuration, the torque provided to hinge 108 is friction torque from the engagement of switch bolt 112 with switch bolt receptacle 122.

Figure 5:
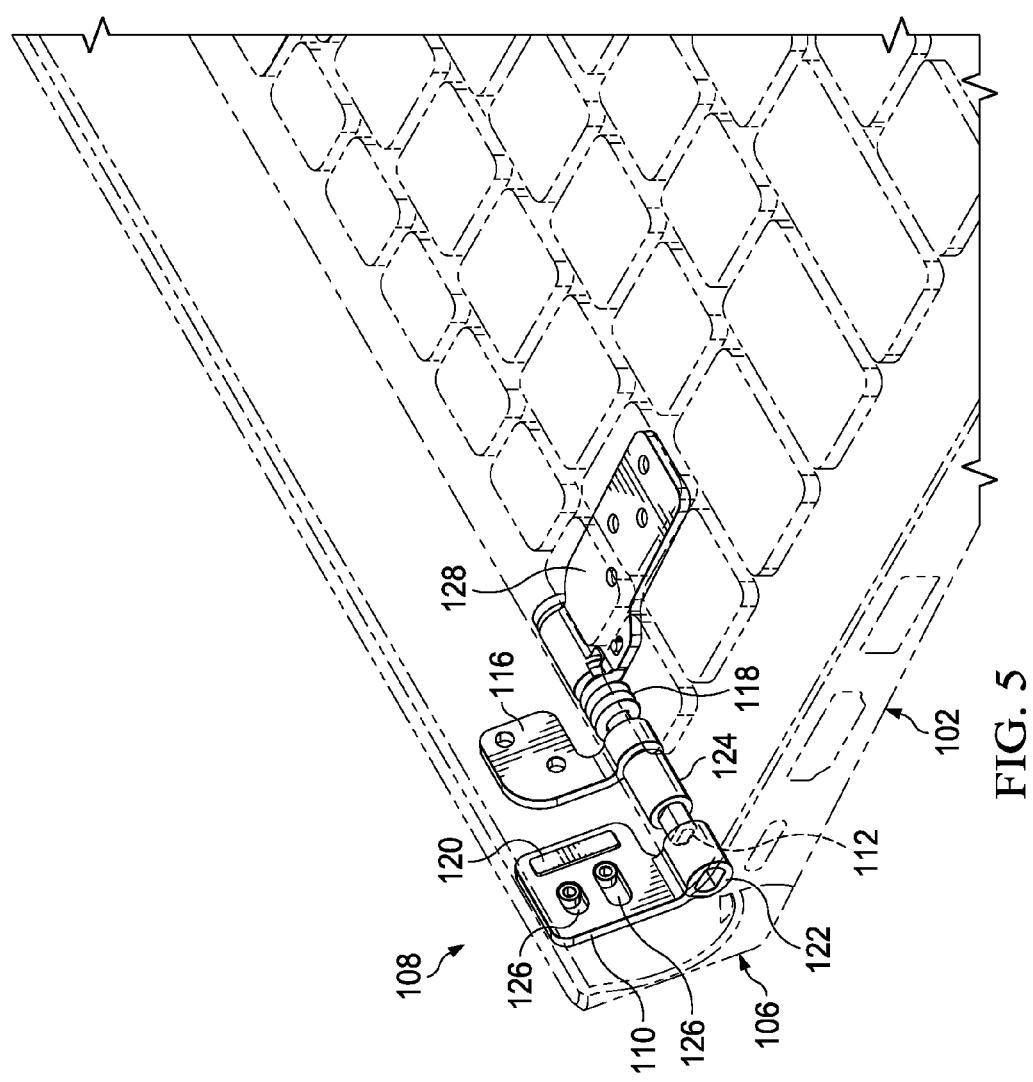
FIG. 5 is a simplified schematic diagram illustrating an orthographic view of a portion of an electronic device, in accordance with one example implementation.

Turning to FIG. 5, FIG. 5 is a simplified schematic diagram illustrating an orthographic view of a portion of an electronic device, in accordance with one example implementation. As illustrated in FIG. 5, first housing hinge plate 128 has been coupled to first housing 102, cradle hinge plate 116 has been coupled to cradle 106. Hinge 108 is in a default configuration and switch mechanism 120 has not been activated.

Figure 6:
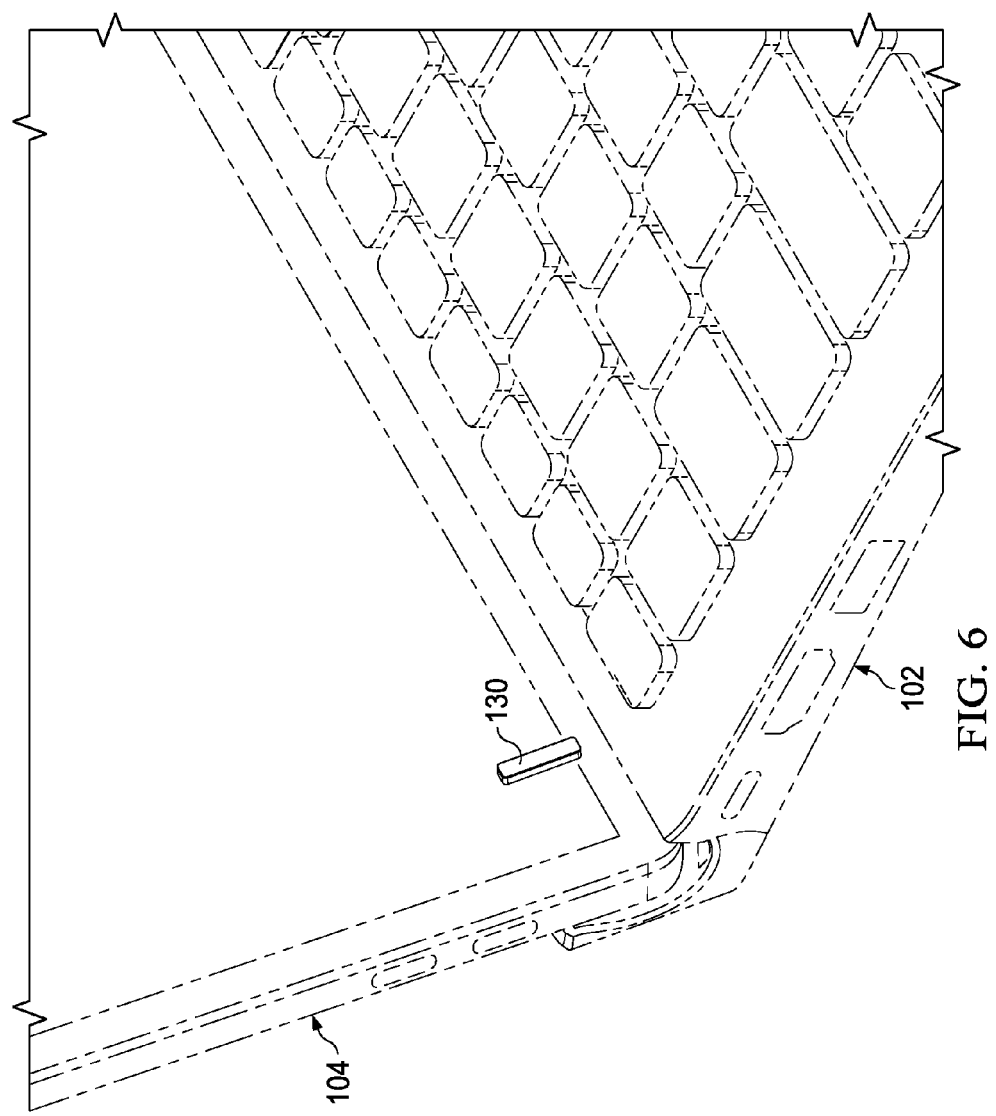
FIG. 6 is a simplified schematic diagram illustrating an orthographic view of a portion of an electronic device, in accordance with one example implementation.

Turning to FIG. 6, FIG. 6 is a simplified schematic diagram illustrating an orthographic view of a portion of an electronic device, in accordance with one example implementation. Second housing 104 can include a switch activating mechanism 130. Switch activating mechanism 130 can be configured to interact with and activate switch mechanism 120. In an example, switch activating mechanism 130 may be a magnet configured to attract and activate switch mechanism 120.

Figure 7:
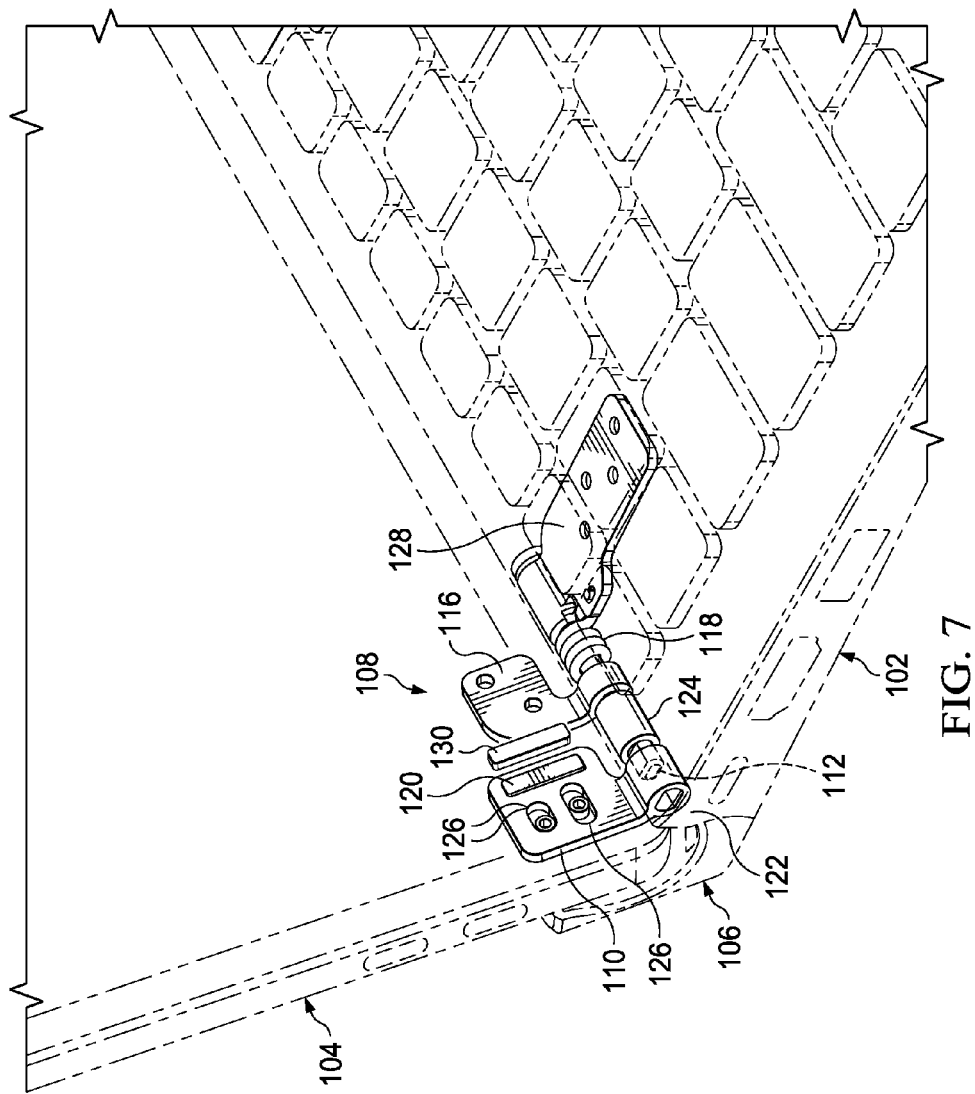
FIG. 7 is a simplified schematic diagram illustrating an orthographic view of a portion of an electronic device, in accordance with one example implementation.

Turning to FIG. 7, FIG. 7 is a simplified schematic diagram illustrating an orthographic view of a portion of an electronic device, in accordance with one example implementation. When second housing 104 is docket in cradle 106, switch activating mechanism 130 can activate switch mechanism 120. Switch mechanism 120 moves switch plate 110 to cause switch bolt receptacle 122 to engage switch bolt 112 which will add friction torque to the hinge. This provides a torque to allow a user to adjust for screen angle viewing. When second housing 104 is removed from cradle 106, switch mechanism 120 is deactivated and switch bolt 112 moves away from and disengages switch bolt receptacle 122. Spring torque from torsion spring 118 (e.g., torsion spring 118 compresses) will cause hinge 108 return to the default position illustrated in FIG. 5. The switch bolt 112 angularly moves with the switch plate 110 when it is engaged. When the second housing 104 is removed, switch plate 110 will move away from and disengage switch bolt 112 and reduce the friction torque and allow spring 118 to return the cradle dock to the default position. In other examples, the switch plate can move by electrical means such as an electrical switch that could be activated when second housing 104 is placed in cradle, is activated by a user, or some other means that may be used to activate and move switch plate 110 and cause switch bolt receptacle 122 to engage switch bolt 112.

Figure 8:
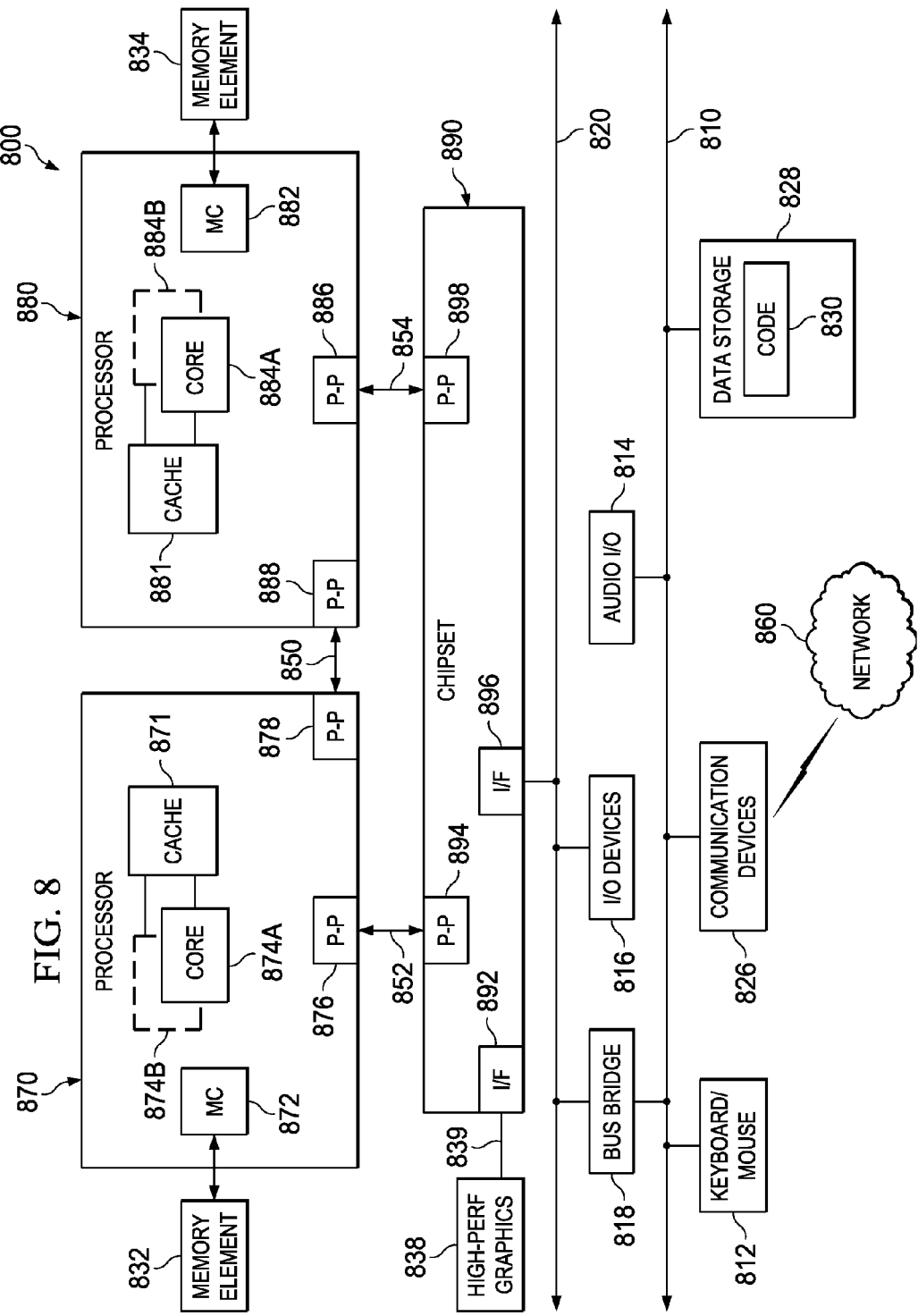
FIG. 8 is a block diagram illustrating an example computing system that is arranged in a point-to-point configuration in accordance with an embodiment.

Turning to FIG. 8, FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements of electronic device 100 may be configured in the same or similar manner as computing system 800.

As illustrated in FIG. 8, system 800 may include several processors, of which only two, processors 870 and 880, are shown for clarity. While two processors 870 and 880 are shown, it is to be understood that an embodiment of system 800 may also include only one such processor. Processors 870 and 880 may each include a set of cores (i.e., processor cores 874A and 874B and processor cores 884A and 884B) to execute multiple threads of a program. The cores may be configured to execute instruction code in a manner similar to that discussed above with reference to FIGS. 2-6. Each processor 870, 880 may include at least one shared cache 871, 881. Shared caches 871, 881 may store data (e.g., instructions) that are utilized by one or more components of processors 870, 880, such as processor cores 874 and 884.

Processors 870 and 880 may also each include integrated memory controller logic (MC) 872 and 882 to communicate with memory elements 832 and 834. Memory elements 832 and/or 834 may store various data used by processors 870 and 880. In alternative embodiments, memory controller logic 872 and 882 may be discrete logic separate from processors 870 and 880.

Processors 870 and 880 may be any type of processor, and may exchange data via a point-to-point (PtP) interface 850 using point-to-point interface circuits 878 and 888, respectively. Processors 870 and 880 may each exchange data with a control logic 890 via individual point-to-point interfaces 852 and 854 using point-to-point interface circuits 876, 886, 894, and 898. Control logic 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Control logic 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 9:
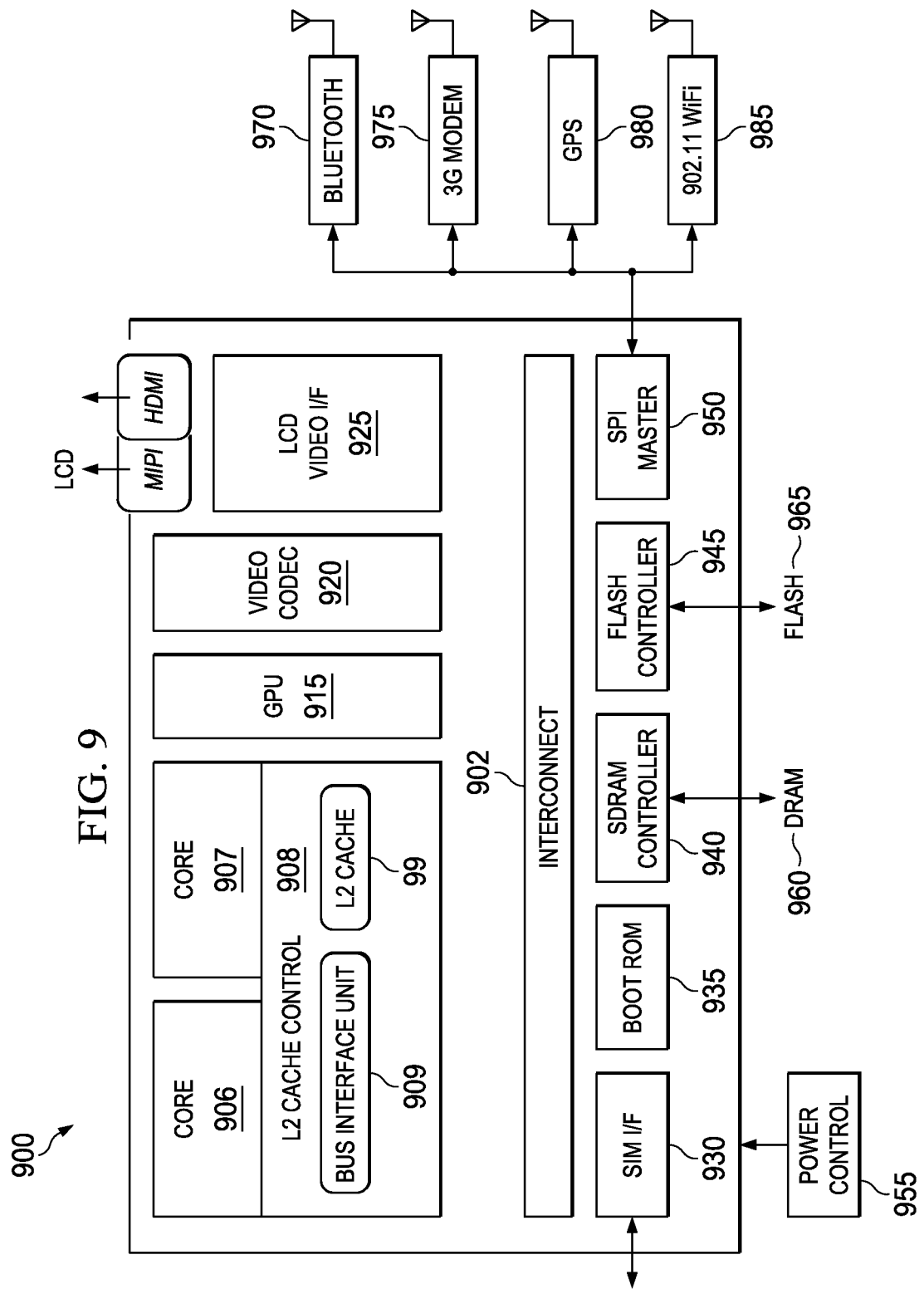
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the hinge configuration features discussed herein and an ARM component. For example, the example of FIG. 9 can be associated with any ARM core (e.g., A-7, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 10:
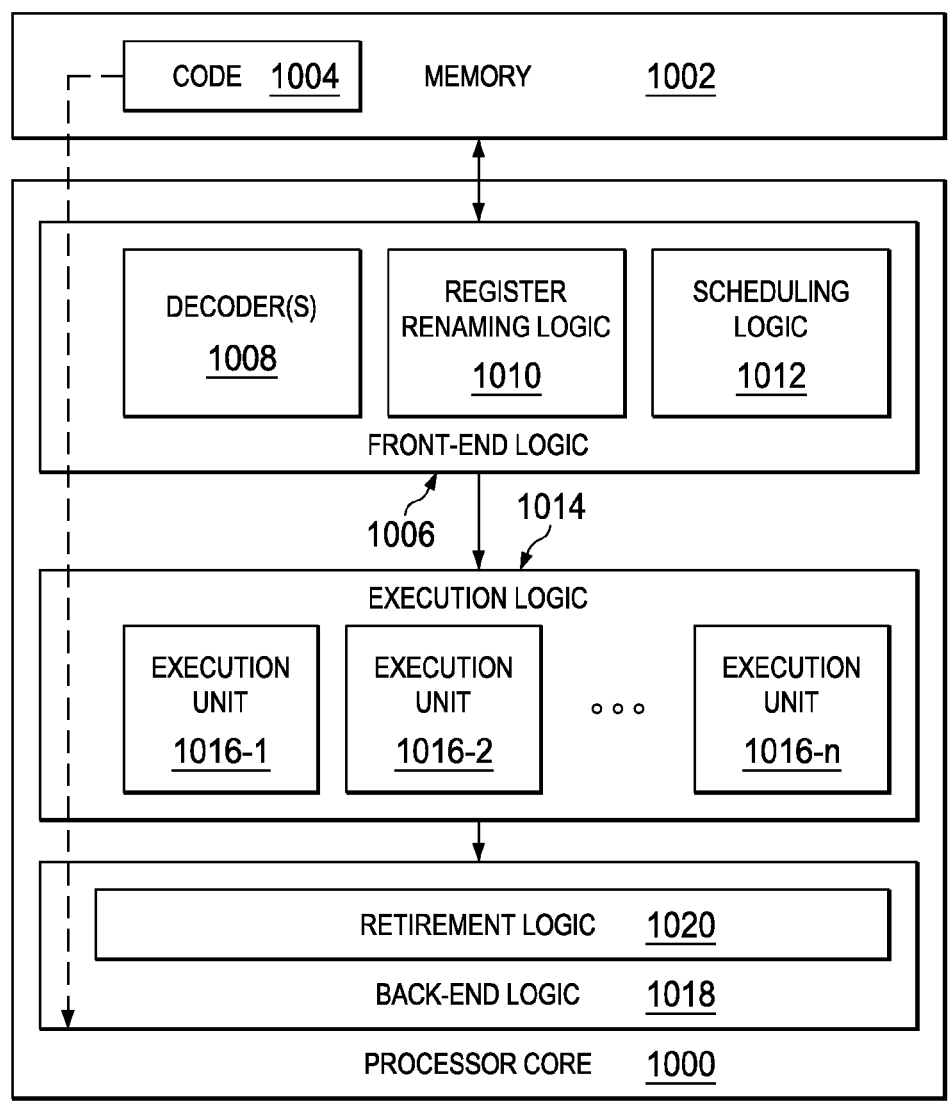
FIG. 10 is a block diagram illustrating an example processor core in accordance with an embodiment.

Turning to FIG. 10, FIG. 10 illustrates a processor core 1000 according to an embodiment. Processor core 10 may be the core for any type of processor, such as a micro-processor, an embedded processor, a digital signal processor (DSP), a network processor, or other device to execute code. Although only one processor core 1000 is illustrated in FIG. 10, a processor may alternatively include more than one of the processor core 1000 illustrated in FIG. 10. For example, processor core 1000 represents an embodiment of processors cores 874a, 874b, 884a, and 884b shown and described with reference to processors 870 and 880 of FIG. 8. Processor core 1000 may be a single-threaded core or, for at least one embodiment, processor core 1000 may be multithreaded in that it may include more than one hardware thread context (or "logical processor") per core.

FIG. 10 also illustrates a memory 1002 coupled to processor core 1000 in accordance with an embodiment. Memory 1002 may be any of a wide variety of memories (including various layers of memory hierarchy) as are known or otherwise available to those of skill in the art. Memory 1002 may include code 1004, which may be one or more instructions, to be executed by processor core 1000. Processor core 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor core 1000 can also include execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor core 1000 allows out of order execution but requires in order retirement of instructions. Retirement logic 1020 may take a variety of known forms (e.g., re-order buffers or the like). In this manner, processor core 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processor may include other elements on a chip with processor core 1000, at least some of which were shown and described herein with reference to FIG. 8. For example, as shown in FIG. 8, a processor may include memory control logic along with processor core 1000. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that electronic device 100 and its teachings are readily scalable and can accommodate a large number of components, as well as more complicated/ sophisticated arrangements and configurations. Accordingly, the examples provided should not limit the scope or inhibit the broad teachings of electronic device 100 as potentially applied to a myriad of other architectures.

It is also important to note that the operations in the diagrams illustrate only some of the possible correlating scenarios and patterns that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 has been illustrated with reference to particular elements and operations that facilitate the communication process, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 172 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is a device that includes a first housing, a cradle, and a hinge that rotatable couples the first housing to the cradle. The hinge includes a switch bolt configured to selectively provide friction torque to the hinge, a torsion spring configured to provide spring torque to the hinge, and a switch mechanism to activate and deactivate the switch bolt, wherein the friction torque provided by the switch bolt is greater than the spring torque provided by the torsion spring.

In Example A2, the subject matter of Example A1 may optionally include where the hinge further includes a switch bolt receptacle to couple with the switch bolt and provide the friction torque.

In Example A3, the subject matter of any of the preceding 'A' Examples can optionally include where hinge further includes a switch plate, wherein the switch mechanism selectively moves the switch plate to couple and decouple the switch bolt and the switch bolt receptacle.

In Example A4, the subject matter of any of the preceding 'A' Examples can optionally include where the switch mechanism is activated when a second housing is inserted into the cradle.

In Example A5, the subject matter of any of the preceding 'A' Examples can optionally include where the second housing is a standalone tablet.

In Example A6, the subject matter of any of the preceding 'A' Examples can optionally include where the switch mechanism is a magnet.

In Example A7, the subject matter of any of the preceding 'A' Examples can optionally include where the spring torque causes the hinge to be in default position.

Example M1 is a method that includes activating a switch mechanism in a hinge and deactivating the switch mechanism, wherein the deactivation causes the hinge to return to a default position. The hinge includes a switch bolt configured to selectively provide friction torque to the hinge upon activation of the switch, and a torsion spring configured to provide spring torque to the hinge, where the friction torque provided by the switch bolt is greater than the spring torque provided by the torsion spring.

In Example M2, the subject matter of any of the preceding 'M' Examples can optionally include where the hinge further includes a switch bolt receptacle to couple with the switch bolt and provide the friction torque.

In Example M3, the subject matter of any of the preceding 'M' Examples can optionally include where hinge further includes a switch plate, wherein the switch mechanism selectively moves the switch plate to couple and decouple the switch bolt and the switch bolt receptacle.

In Example M4, the subject matter of any of the preceding 'M' Examples can optionally include where the switch mechanism is activated when a second housing is inserted into the cradle.

In Example M5, the subject matter of any of the preceding 'M' Examples can optionally include where the second housing Is a standalone tablet.

In Example M6, the subject matter of any of the preceding 'M' Examples can optionally include where the switch mechanism is a magnet.

In Example M7, the subject matter of any of the preceding 'M' Examples can optionally include where the spring torque causes the hinge to be in default position.

An example system S1 can include a first housing, a cradle configured to accept a second housing, and a hinge that rotatable couples the first housing to the cradle. The hinge includes a switch bolt configured to selectively provide friction torque to the hinge, a torsion spring configured to provide spring torque to the hinge, and a switch mechanism to activate and deactivate the switch bolt, wherein the friction torque provided by the switch bolt is greater than the spring torque provided by the torsion spring.

An example system S2 can include where the hinge further includes a switch bolt receptacle to couple with the switch bolt and provide the friction torque.

In Example S3, the subject matter of any of the preceding 'SS' Examples can optionally include where hinge further includes a switch plate, wherein the switch mechanism selectively moves the switch plate to couple and decouple the switch bolt and the switch bolt receptacle.

In Example S4, the subject matter of any of the preceding 'SS' Examples can optionally include where the switch mechanism is activated when a second housing is inserted into the cradle.

In Example S5, the subject matter of any of the preceding 'SS' Examples can optionally include where the accessory includes a portion of a ferrous housing to reduce one or more stray magnetic fields.

In Example S6, the subject matter of any of the preceding 'S' Examples can optionally include where the second housing is a standalone tablet.

In Example S6, the subject matter of any of the preceding 'S' Examples can optionally include where the spring torque causes the hinge to be in default position.

Example X1 is a machine-readable storage medium including machine-readable instructions to implement a method or realize an apparatus as in any one of the Examples A1-A7, and M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A device, comprising:
   a first housing;
   a cradle; and
   a hinge that rotatably couples the first housing to the cradle, wherein the hinge includes:
   a switch bolt configured to selectively provide friction torque to the hinge;
   a torsion spring configured to provide spring torque to the hinge, and
   a switch mechanism to activate and deactivate the switch bolt, wherein the friction torque provided by the switch bolt is greater than the spring torque provided by the torsion spring.

2. The device of claim 1, wherein the hinge further includes a switch bolt receptacle to couple with the switch bolt and provide the friction torque.

3. The device of claim 1, wherein the hinge further includes a switch plate, wherein the switch mechanism selectively moves the switch plate to couple and decouple the switch bolt and the switch bolt receptacle.

4. The device of claim 1, wherein the switch mechanism is activated when a second housing is inserted into the cradle.

5. The device of claim 4, wherein the second housing is a standalone tablet.

6. The device of claim 4, wherein the switch mechanism is a magnet.

7. The device of claim 1, wherein the spring torque causes the hinge to be in default position.

8. A method, comprising:
   activating a switch mechanism in a hinge, wherein the hinge includes:
   a switch bolt configured to selectively provide friction torque to the hinge upon activation of the switch mechanism; and
   a torsion spring configured to provide spring torque to the hinge, wherein the friction torque provided by the switch bolt is greater than the spring torque provided by the torsion spring; and
   deactivating the switch mechanism, wherein the deactivation causes the hinge to return to a default position.

9. The method of claim 8, wherein the hinge further includes a switch bolt receptacle to couple with the switch bolt and provide the friction torque.

10. The method of claim 8, wherein the hinge further includes a switch plate, wherein the switch mechanism selectively moves the switch plate to couple and decouple the switch bolt and the switch bolt receptacle.

11. The method of claim 8, wherein the switch mechanism is activated when a second housing is inserted into the cradle.

12. The method of claim 11 wherein the second housing is a standalone tablet.

13. The method of claim 8, wherein the switch mechanism is a magnet.

14. The method of claim 8, wherein the spring torque causes the hinge to be in default position.

15. A system, comprising:
    a first housing;
    a cradle configured to accept a second housing; and
    a hinge that rotatable couples the first housing to the cradle, wherein the hinge includes:
    a switch bolt configured to selectively provide friction torque to the hinge;
    a torsion spring configured to provide spring torque to the hinge, and
    a switch mechanism to activate and deactivate the switch bolt, wherein the friction torque provided by the switch bolt is greater than the spring torque provided by the torsion spring.

16. The system of claim 15, wherein the hinge further includes a switch bolt receptacle to couple with the switch bolt and provide the friction torque.

17. The system of claim 15, wherein the hinge further includes a switch plate, wherein the switch mechanism selectively moves the switch plate to couple and decouple the switch bolt and the switch bolt receptacle.

18. The system of claim 15, wherein the switch mechanism is activated when the second housing is inserted into the cradle.

19. The system of claim 15, wherein the second housing is a standalone tablet.

20. The system of claim 15, wherein the spring torque causes the hinge to be in a default position.

* * * * *